United States Patent [19]

Weaver et al.

[11] 4,379,802
[45] Apr. 12, 1983

[54] STAMPABLE REINFORCED THERMOPLASTIC POLYESTER SHEET WITH IMPROVED SURFACE FINISH

[75] Inventors: James C. Weaver; Robert W. Seymour, both of Kingsport, Tenn.

[73] Assignee: Eastman Kodak Company, Rochester, N.Y.

[21] Appl. No.: 370,319

[22] Filed: Apr. 21, 1982

[51] Int. Cl.³ .................... B32B 15/00; B32B 17/00
[52] U.S. Cl. .................................. 428/220; 428/283; 428/285; 428/288; 428/325; 428/328; 428/331; 428/341; 428/480; 428/482; 428/483
[58] Field of Search ............ 428/220, 283, 285, 288, 428/325, 328, 331, 341, 480, 482, 483

[56] References Cited

U.S. PATENT DOCUMENTS 4,302,499  11/1981  Grisch ............................ 428/285

Primary Examiner—Marion McCamish
Attorney, Agent, or Firm—Malcolm G. Dunn; Daniel B. Reece, III

[57] ABSTRACT

Stampable sheet of reinforced thermoplastic material having a plurality of layers of polymeric material and a plurality of layers of fibrous reinforcing material alternating with the layers of polymeric material, the polymeric material layers having minimum crystallization half-times upon heating of one minute or less with the fifth layer of the sheet being polymeric material having a shrinkage of less than 2% as determined in accordance with ASTM Method D-955, and the first or outer layer and the third layer of the sheet being polymeric material layers having about 5 to about 50 weight percent fillers; with all of the layers being integrally formed together and possessing a smooth surface, essentially free of fiber "read-through", and having more uniform reinforcement in the sheet, and of the type required of exterior automotive-type appearance parts; and a stamped sheet formed from the stampable sheet and having a heat deflection temperature under 264 psi. load greater than $T_m$-50° C., where $T_m$ is the melting point in the outer layers of the sheet.

14 Claims, No Drawings

STAMPABLE REINFORCED THERMOPLASTIC POLYESTER SHEET WITH IMPROVED SURFACE FINISH

DESCRIPTION

FIELD OF THE INVENTION

Our invention relates to stampable thermoplastic polyester sheets and particularly to glass-reinforced thermoplastic sheets of laminate or composite construction for forming automotive parts as well as for other applications, the forming being accomplished by the use of various sheet metal forming techniques, such as by stamping apparatus; and to stamped sheets from the stampable reinforced thermoplastic polyester sheets; both the stampable sheet and the stamped sheet having at least one smooth outer surface essentially free of fiber "read-through".

Automotive companies have been changing from the use of die-cast metal to the use of reinforced plastics for many different parts of an automobile in order to take advantage of the resulting reduced weight. For large parts these reinforced plastics have been in the form of sheet molding compounds (SMC) which are based on thermoset resins which require a chemical reaction to occur in order to cure the plastic. Generally the forming equipment requires apparatus more simple than that required to injection mold parts of comparable size. Many disadvantages exist, however, such as long cycle time in order to cure the thermoset resin, poor surface finish and complexity of resin compositions.

BACKGROUND OF THE INVENTION

Representative, for instance, of some kinds of development activities occurring in the past 10 years for reducing the weight of automobiles and thereby enabling the autoist to be more conservative of fuel, would appear to be the following.

According to the May 1969 issue of "Autoproducts", the G.R.T.L. Company, a joint development venture of PPG Industries, Inc. and Union Carbide Corporation, was formed (about 1968) to produce a family of glass-reinforced thermoplastic sheets called "Azdel" which could be formed on conventional metal-stamping apparatus for the purpose of meeting the automobile industry's need for high-speed productivity, for example 180 to 360 parts per hour with a single press. The Azdel glass-reinforced thermoplastic sheet can be formed in one operation into shapes that take four or more separate stamping operations when working with a sheet of steel. The Azdel sheet made from polypropylene is preheated in an infrared oven to about 400° F. (about 204° C.) then fed into a press and formed between cooled matched metal dies. The operation, according to the article, is scrap-free and as the stamped Azdel sheet comes from the mold it has no flash or trim, and holes and notches can be formed in the stamping operation. Shapes can be stamped from Azdel sheets that would be impossible in steel; and in some cases an assembly of several parts in steel can be redesigned so that it can be made in one part from an Azdel sheet.

Also according to the Jan. 22, 1968 issue of "Chemical and Engineering News", the Azdel glass-reinforced thermoplastic sheets reportedly could be made from styrene acrylonitrile copolymer (42% glass reinforced), polyvinyl chloride (36% glass reinforced), polypropylene (44% glass reinforced) or other resins. The Azdel sheet contains generally about 40% glass fiber by weight. Reinforced polypropylene has a heat distortion temperature of 327° F. (about 164° C.); styrene acrylonitrile copolymer, 255° F. (about 124° C.); and polyvinylchloride, 221° F. (about 105° C.). A given part can be formed from a variety of blank sizes, such as an 84 mil. thick hood can be formed from a 150 mil. thick by 100 sq. in. blank or from a 125 mil. thick by 121 sq. in. blank ("SPE Journal", September 1972, Vol. 28, pages 38–42).

Further, in the September 1976 issue of "Plastics World", page 53, there was a later announcement that a new grade of Azdel sheet based on PBT (polybutylene terephthalate) thermoplastic polyester reinforced with 30 weight percent of continuous glass fiber mat was being offered. These Azdel sheets were formed in a stamping operation after being preheated to 450° F. to 500° F. (about 232° C. to about 260° C.).

Allied Chemical Corporation, for instance, produces a stampable nylon 6 composite sheet which is registered under the name STX, and has a combination of about 50% nylon 6 resin, about 30% glass fiber reinforcements and about 20% fillers. The composite sheet must be heated to a temperature above its melting point before it can be stamp formed, according to an article in the March 1979 issue of "Plastics Engineering" (pages 47–49).

In every instance mentioned above, the preheating of the composite sheet apparently has to take place at or above the melting point of the thermoplastic material being used in the sheet. Such heating, of course, requires that a significant amount of energy be used for each sheet. Also heating at or above the melting point means that greater care must be exercised in transporting a sheet in its melt or above-melt state as from the infrared oven to the forming or stamping press.

One thermoplastic material that does not appear to be given as much mention in the literature for structural purposes as other thermoplastic materials is the polyester, poly(ethylene terephthalate). It is noted, for instance, in U.S. Pat. No. 3,547,891 that there is disclosed a thin film material or sheet material (about 7.5 to 10 mil. in thickness) of poly(ethylene terephthalate), that has been vacuum heat formed, starting and ending essentially in the amorphous state. This amorphous final state would apparently be suitable for the final product, as for use in blister packages, as mentioned in the patent, but not for use in the final form of automobile parts. Another patent, U.S. Pat. No. 3,496,143, discloses a process for vacuum deep-drawing of poly(ethylene terephthalate) sheet material, which must have a solution viscosity [as determined in a 1% solution of the poly(ethylene terephthalate) in meta-cresol at 25° C.] of about 1.7 to about 2.0 and a degree of crystallization of at least 5% up to about 25%. Neither this sheet material nor the one disclosed in U.S. Pat. No. 3,547,891 is a reinforced material or one of laminate construction. U.S. Pat. No. 3,496,143 specifies that its vacuum-formed product is not amorphous and that it has a higher degree of crystallinity that the initial material being molded; the molded material also being considered as having a degree of crystallinity in the range of 5% to 25%.

U.S. Pat. No. 3,765,998 discloses a high-impact resin sheet which is formable in shaping apparatus held at ambient temperature and concerns a glass mat having a glass fiber length of at least one inch, impregnated with poly(ethylene terephthalate) having a weight average molecular weight from about 5,000 to about 45,000. The sheets are preheated from about 240° C. to about 280° C.

and are then transferred to a mold or press where they are cooled slowly under pressure to develop crystallinity (Examples 1 through 8). Examples 9 and 10 speak of chilling the laminate sheet, but since there is no indication of the rate of chilling taking place, the state of crystallinity cannot be determined. In any event the patent teaches preheating to around the melt temperature for all examples. There is an indication in the specification that the "PET" [poly(ethylene terephthalate)] polymer has a level of crystallinity of from about 20% to about 60% as determined by X-ray techniques (column 3, lines 51–57), but it is not clear whether or not this statement has reference to the polymer in the pellet form prior to impregnation into the sheet or to the polymer when in the sheet form.

An advantage of the use of thermoplastic resin instead of the thermoset resin is that the former needs only to cool below its crystallization temperature before a stamping press can be reopened and the part removed. A thermoset resin part must be given time for a chemical reaction to occur in order to cure the part before it can be removed from a stamping press.

Another advantage is that a thermoplastic part can be recycled, if need be, by reheating, whereas a thermoset part cannot be recycled by reheating.

U.S. Pat. No. 4,263,364 discloses reinforced thermoplastic polyester sheets which can be rapidly quenched from the melt to a stable amorphous state. The quenched, amorphous sheets may then be stamp-formed at temperatures that are below the melting point ($T_m$) of the polyester but above its glass transition ($T_g$) temperature, or the quenched amorphous sheets may be stored and then stamp-formed at another time. In this manner, therefore, considerable energy will be saved as compared to some of the other prior art processes mentioned above involving the necessity of heating to or above the melt temperature of the polymer involved. Also the sheet may be more easily handled in moving it to a forming or stamping apparatus than one heated at or above the melt temperature. Further, flat amorphous sheets can be stored indefinitely at ambient temperatures until needed and then transported to a forming or stamping press. The resulting formed or stamped part retains the shape of the mold in the press and possesses an overall high set of properties such as surface appearance, heat distortion temperature, flexural and impact strength which qualify it for use in both appearance and structural applications. The resulting sheet will thus find utility in such applications as exterior automotive parts, which are exposed to elevated paint oven temperatures.

The reinforced thermoplastic polyester sheet thus may be produced and then reduced to an amorphous state and subsequently stamped and crystallized simultaneously at a temperature below the melting point of the polyester but above the glass transition temperature. The reinforced stampable thermoplastic polyester sheet of laminate construction has a center layer or layers which is or are comprised of a more slowly crystallizing polymer than the outer layers of the sheet. This construction reduces the need to rapidly quench the core of the sheet so as to form the amorphous sheet and thus enables higher production rates and the production of thicker amorphous sheets.

Some essential requirements of a stampable sheet that is to be used for exterior automotive-type appearance parts are that the sheet have a smooth surface and that it is essentially free of fiber "read-through". The latter occurs when the polymer layer above the layer of fibrous reinforcement, such as glass fiber reinforcement, crystallizes so fast that it shrinks around the glass fibers and pulls on them, resulting in a "read-through" of the fibers. Some polymers, however, which are effective in reducing or eliminating fiber "read-through" when used as layers in the sheet, also can cause a blistering of the surface to appear in the formed part. Such blisters represent another type of surface defect which must be avoided. Thus, sheet compositions are needed in which fiber "read-through" is eliminated and in which no blistering occurs during operations connected with forming a part from the stampable sheet.

An object of the invention, therefore, is to produce a stampable sheet which is subsequently stamped into parts which are highly crystalline and suitable for painting and baking and may be used for exterior automotive panels, the sheet being characterized by a smooth, glossy surface, an absence of fiber read-through, and high mechanical properties including a high heat deflection temperature.

Another object is to provide a stamped sheet from the stampable sheet, the stamped sheet having a heat deflection temperature under 264 psi. load greater than $T_m - 50°$ C. where $T_m$ is the melting point of the outer layers of the sheet.

On forming ribs or bosses or similar shapes from a stampable sheet where the primary reinforcement is due to the use of continuous fibrous reinforcing mats, resin-rich areas are generally produced in the outer regions of such ribs or bosses or similar shapes. Because of the lack of reinforcement in these regions, they will generally have lower mechanical properties than found in the other regions of the sheet.

Still another and more significant object of the invention, therefore, is to provide a stampable sheet that will have more uniform reinforcement in the sheet when it is subsequently formed into a stamped sheet in order to provide the necessary reinforcement in such ribs or bosses or similar shapes.

As mentioned above, the use of some polymers in the layers of a reinforced thermoplastic polyester sheet will, upon being subjected to heat in an infrared oven for subsequent stamping or forming of the sheet, result in blistering of that layer or layers in the formed part. This blistering also undesirably extends up through the sheet and is revealed on the surface of the sheet.

Still another object, therefore, is to provide a stamped sheet from the stampable sheet that is free from blistering. Other objects inherent in the nature of the invention will become apparent to those skilled in the art to which this invention pertains.

DISCLOSURE OF THE INVENTION

In accordance with the present invention, we provide a stampable sheet of reinforced thermoplastic material having on at least one surface of the sheet a smooth surface suitable for use as exterior automotive panels and the like, the sheet having a plurality of layers of polymeric material and a plurality of layers of fibrous reinforcing material alternating with the layers of polymeric material, all of the layers being integrally formed together.

The outer layers of the sheet are of a crystallizable material selected from poly(ethylene terephthalate), copolymers of poly(ethylene terephthalate) and blends thereof, poly(1,4-cyclohexanedimethylene terephthalate), copolymers of poly(1,4-cyclohexanedimethylene terephthalate) and blends there-of having a minimum crystallization half-time upon heating of one minute or less, the minimum crystallization half-time being that measured with respect to each individual layer of the outer layers.

A layer of a surfacing mat of fine stranded glass of continuous filaments randomly patterned, having a weight of about 0.1 to about 0.4 oz./sq. ft., is positioned contiguously with respect to one of the outer layers of the sheet.

Then a third layer of polymeric material is positioned contiguously with the side of the second or surfacing mat layer opposite from the first layer and selected from
  a. poly(ethylene terephthalate);
  b. copolymers of poly(ethylene terephthalate) and blends thereof;
  c. poly(1,4-cyclohexanedimethylene terephthalate);
  d. copolymers of poly(1,4-cyclohexanedimethylene terephthalate) and blends thereof;
  e. a polyetherester comprised of
    1. a dicarboxylic acid component comprised of
      A. 100 to 60 mole percent terephthalic acid, and
      B. 0 to 40 mole percent of an aliphatic or aromatic dicarboxylic acid having a molecular weight of less than 300, and
    2. a diol component comprised of
      A. a glycol comprised of 100 to 60 mole percent tetramethylene glycol and 0 to 40 mole percent of an aliphatic or aromatic glycol having a molecular weight of less than 300, and
      B. 10 to 60 weight percent, based on the weight of the polyetherester, of a poly(alkylene oxide) glycol having 2, 3 or 4 carbon atoms in the repeating unit and having a molecular weight in the range of 400 to 5000,
      wherein the sum of the total mole percent amount of aliphatic or aromatic dicarboxylic acid having a molecular weight of less than 300 in item e.1.B., the mole percent amount of aliphatic or aromatic glycol having a molecular weight of less than 300 in item e.2.A., and the weight percent, based on the weight of the polyetherester, of the poly(alkylene oxide) glycol in item e.2.B equals at least 25 but does not exceed 80;
  f. a polyetherester comprised of
    1. a dicarboxylic acid component comprised of
      A. 100 to 98 mole percent terephthalic acid, and
      B. 0 to 2 mole percent of a trifunctional carboxylic acid of molecular weight less than 300;
    2. a diol component comprised of
      A. a glycol comprised of 90-60 mole percent 1,4-cyclohexanedimethanol and 10 to 40 mole percent ethylene glycol or tetramethylene glycol, and
      B. 10 to 50 weight percent, based on the weight of the polyetherester, of a poly(alkylene oxide) glycol having 2 to 4 carbon atoms in the repeating unit and having a molecular weight in the range of 400 to 2000;
  g. a polyetherester comprised of
    1. a dicarboxylic acid component comprised of
      A. 100 to 98 mole percent 1,4-cyclohexanedicarboxylic acid and
      B. 0 to 2 mole percent of a trifunctional carboxylic acid of molecular weight less than 300;
    2. a diol component comprised of
      A. 1,4-cyclohexanedimethanol and
      B. 10 to 60 weight percent, based on the weight of the polyetherester, of a poly(alkylene oxide) glycol having 2 to 4 carbon atoms and a molecular weight in the range of 400 to 2000,
items (a) through (g) having a minimum crystallization half-time upon heating of one minute or less, the minimum crystallization half-time being that as measured with respect to each individual layer;
the first and third layers of polymeric material each having about 5 to about 50 weight percent fillers selected from chopped strands of fiber glass of lengths less than about ¼ inch, milled glass, glass shperes, novacite, talc, mica, calcium carbonate, barium sulfate and kaolin;
a fourth layer comprising one of the layers of fibrous reinforcing material being positioned contiguously with the side of the third layer opposite from the second layer; and
a fifth layer of polymeric material positioned contiguously with the side of the fourth layer of the fibrous reinforcing material opposite from the third layer of polymeric material and selected from
  h. copolymers of poly(1,4-cyclohexylenedimethylene 1,4-cyclohexanedicarboxylate) with about 10 to about 30 mole percent dimer acid;
  i. a polyetherester comprised of
    1. a dicarboxylic acid component comprised of
      A. 100 to 60 mole percent terephthalic acid, and
      B. 0 to 40 mole percent of an aliphatic or aromatic dicarboxylic acid having a molecular weight of less than 300, and
    2. a diol component comprised of
      A. a glycol comprised of 100 to 60 mole percent tetramethylene glycol and 0 to 40 mole percent of an aliphatic or aromatic glycol having a molecular weight of less than 300, and
      B. 10 to 60 weight percent, based on the weight of the polyetherester, of a poly(alkylene oxide) glycol having 2, 3 or 4 carbon atoms in the repeating unit and having a molecular weight in the range of 400 to 5000,
      wherein the sum of the total mole percent amount of aliphatic or aromatic dicarboxylic acid having a molecular weight of less than 300 in item i.1.B., the mole percent amount of aliphatic or aromatic glycol having a molecular weight of less than 300 in item i.2.A., and the weight percent, based on the weight of the polyetherester, of the poly(alkylene oxide) glycol in item i.2.B equals at least 25 but does not exceed 80;
  j. a polyetherester comprised of
    1. a dicarboxylic acid component comprised of
      A. 100 to 98 mole percent terephthalic acid, and
      B. 0 to 2 mole percent of a trifunctional carboxylic acid of molecular weight less than 300;
    2. a diol component comprised of
      A. a glycol comprised of 90-60 mole percent 1,4-cyclohexanedimethanol and 10 to 40 mole percent ethylene glycol or tetramethylene glycol, and
      B. 10 to 50 weight percent, based on the weight of the polyetherester, of a poly(alkylene oxide) glycol having 2 to 4 carbon atoms in the repeating unit and having a molecular weight in the range of 400 to 2000;
  k. a polyetherester comprised of
    1. a dicarboxylic acid component comprised of A. 100 to 98 mole percent 1,4-cyclohexanedicarboxylic acid and
B. 0 to 2 mole percent of a trifunctional carboxylic acid of molecular weight less than 300;
2. a diol component comprised of
A. 1,4-cyclohexanedimethanol and
B. 10 to 60 weight percent, based on the weight of the polyetherester, of a poly(alkylene oxide) glycol having 2 to 4 carbon atoms and a molecular weight in the range of 400 to 2000, items (h) through (k) having a shrinkage of less than 2%, as determined in accordance with ASTM Method D-955, and a minimum crystallization half-time of one minute or less.

The outer layers of the sheet are of a crystallizable material selected from (1) poly(ethylene terephthalate) such as having an inherent viscosity (I.V.) of about 0.4 to about 0.9; (2) copolymers of poly(ethylene terephthalate) having about 5 mole percent or less of 1,4-cyclohexanedimethanol, neopentyl glycol, butylene glycol, 2,2,4,4-tetramethyl-1,3-cyclobutane diol, bisphenol A, propylene glycol, diethylene glycol, hexamethylene glycol, isophthalic acid, adipic acid, or 1,4-cyclohexanedicarboxylic acid; (3) poly(1,4-cyclohexylenedimethylene terephthalate); (4) copolymers of poly(1,4-cyclohexylenedimethylene terephthalate) having about 20 mole percent or less of ethylene glycol, neopentyl glycol, butylene glycol, 2,2,4,4-tetramethyl-1,3-cyclobutanediol, bisphenol A, propylene glycol, diethylene glycol, hexamethylene glycol, isophthalic acid, adipic acid, or 1,4-cyclohexanedicarboxylic acid; (5) blends or poly(ethylene terephthalate) with 35 weight percent or less of the polymers and copolymers of items (2), (3) or (4) above; and (6) blends of poly(1,4-cyclohexylenedimethylene terephthalate) with 35 weight percent or less of the polymers and copolymers of items (1), (2) or (4) above; having a minimum crystallization half-time upon heating of one minute or less, the minimum crystallization half-time being that measured with respect to each individual layer of the outer layers.

In copolymers and blends of poly(ethylene terephthalate) and poly(1,4-cyclohexylenedimethylene terephthalate) [items (2), (4), (5) and (6)], the minimum crystallization half-time will depend upon the composition, the inherent viscosity, the catalyst system used, the presence of inert fillers and, possibly, the presence of impurities. For example, poly(1,4-cyclohexylenedimethylene terephthalate) copolymerized with 5 mole percent ethylene glycol has a minimum crystallization half-time of about 40 seconds, whereas that copolymerized with 26 mole percent ethylene glycol has a minimum crystallization half-time of three minutes. Also, the inherent viscosity, being a measure of molecular weight, affects the crystallization half-time, the minimum crystallization half-time becoming greater as the inherent viscosity increases. For example, poly(ethylene terephthalate) copolymerized with about 5 mole percent 1,4-cyclohexanedimethanol has a minimum crystallization half-time of one minute when the I.V. is about 0.6, but this increases to two minutes if the I.V. is about 0.75. Further, depending upon their ability to initiate crystallization, such materials as inert fillers, catalyst metals and impurities may also serve to decrease the minimum crystallization half-time at a given composition and inherent viscosity.

"Surfacing mats" or "surfacing veils", as identified and claimed herein, are lightweight fiber glass mats varying in thickness from about 10 to about 30 mil. with the filament diameters generally averaging about 17 microns. As pointed out in the Handbook of Fillers and Reinforcements for Plastics (1978), Van Nostrand Reinhold Company, on page 476, surfacing mats or veil mats have been applied to the inside of wet-layup composites, such as tanks and the like, to provide a resin-rich, chemical resistant layer and to protect the underlying reinforcement layers. They are also employed as a surface covering in press-molded items, preventing the reinforcing fiber pattern from appearing in the prime molded exterior. As used in this invention, the surfacing mat or veil is not intended to perform a reinforcing function, although some modicum of reinforcement may result, but rather the surfacing mat or veil is intended to block the general flow-through or interchange of polymers, i.e., to keep the polymers on one side thereof substantially insulated from the polymers on the opposite side of the surfacing mat or veil, despite the pressure that would otherwise cause such flow as a result of the compression applied to form the sheet. In this manner the physical characteristics of one polymeric layer on one side of the surfacing mat will be substantially undiminished by any flow-through or exchange with the polymeric material of the layer on the opposite side of the surfacing mat or veil.

Owens-Corning Fiberglas, for instance, makes a surfacing mat identified as M-514 Surfacing Mat. Nicofibers, Inc. makes a fiber glass surfacing mat called "SURMAT", which is a highly uniform, randomly patterned continuous-filament mat. SURMAT "100" is still another example of a surfacing mat. For a mat that has a 20 mil. thickness, the average weight per square foot is 7.4 grams or about ¼ ounce; and for a mat having a 30 mil. thickness, the average weight per square foot is 9.7 grams or about ⅓ ounce. The filament diameters are about 21 microns.

Item (f) of the third layer of polymeric material and item (c) of the fith layer of polymeric material may comprise poly(about 70 to about 75 mole percent/about 30 to about 25 mole percent 1,4-cyclohexylenedimethylene/butylene terephthalate) modified with about 28 to about 33 weight percent poly(oxytetramethylene) of molecular weight 1000.

Item (f) of the third layer and item (j) of the fifth layer may comprise poly(about 70 to about 75 mole percent/about 30 to about 25 mole percent 1,4-cyclohexylenedimethylene/butylene terpehthalate) modified with about 0.5 to about 0.8 mole percent (based on the acid component present) trimellitic anhydride and about 28 to about 33 weight percent poly(oxytetramethylene) of molecular weight 1000.

Item (g) of the third layer of polymeric material and item (k) of the fifth layer of polymeric material may comprise poly(1,4-cyclohexylenedimethylene 1,4-cyclohexanedicarboxylate) modified with about 0.25 to about 0.75 mole percent (based on the acid component present) trimellitic anhydride and about 22 to about 28 weight percent poly(oxytetramethylene) of molecular weight 1000.

The reinforcing mats are preferably made from fiber glass of continuous strand, such as of high end count roving, laid down in an overlapping swirl pattern to provide high mat uniformity, such as M 8610 Series from Owens-Corning Fiberglas, which may range from about 1 ounce to about 3 ounces per square foot. The function of the reinforcing mat is to provide strength, such as in tensile, flexural and impact strength properties; dimensional stability to hold form and shape under severe mechanical and environmental stresses; and heat resistance to the composite; to mention only a few results from the use of such reinforcing mats.

The overall thickness of the stampable sheet may range from about 40 to about 250 mil. and the layers of glass fiber may comprise about 20 to about 50% by weight of the stampable sheet.

The overall thickness of the stampable sheet may also range from about 50 to about 150 mil. and the layers of glass fiber may comprise about 20 to about 50 percent by weight of the stampable sheet.

The overall thickness of the stampable sheet may further range from about 60 to about 100 mil. and the layers of glass fiber may comprise about 30 to about 40% by weight of the stampable sheet.

The other of the outer layers of polymeric material may have about 5 to about 50 weight percent fillers selected from chopped strands of fiber glass of length less than about ¼ inch, milled glass, glass spheres, novacite, talc, mica, calcium carbonate, barium sulfate and kaolin.

The fifth polymeric layer may also have about 5 to about 50 weight percent fillers selected from chopped strands of fiber glass of length less than about 174 inch, milled glass, glass spheres, novacite, talc, mica, calcium carbonate, barium sulfate and kaolin.

The stamped sheet of reinforced material from the stampable sheet described above preferably has a heat deflection temperature under 264 psi. load greater than $T_m$-50° C. where $T_m$ is the melting point of the outer layers of the sheet. The layers of fibrous reinforcing material of the stamped sheet may be comprised of glass fibers.

The crystallization half-time is defined as the length of time required at a given temperature for an originally amorphous polymer sample to crystallize 50% of the amount to which it eventually crystallizes at that temperature. For example, poly(ethylene terephthalate) crystallizes at about 60% at 180° C. and never 100%. Thus only 50% of 60%, or 30%, or crystallinity is obtained after one crystallization half-time. The minimum crystallization half-time is that half-time which corresponds to the minimum point of the curve when half-time is plotted against temperature.

Values reported as "crystallization half-times" are measured in the following manner. A sample of the polyester is placed in the sample pan of a Perkin-Elmer DSC-2 differential scanning calorimeter. An amount of fine mesh $Al_2O_3$ sufficient to minimize transient responses is placed in the reference pan. The sample is then heated to a temperature above the melting point of the polyester (for example about 285° C. for PET). When the sample is thoroughly melted, it is quickly cooled to the desired crystallization temperature and allowed to crystallize isothermally while the crystallization exotherm is recorded as a function of time. Zero time is taken as the moment at which the instrument reaches the chosen crystallization temperature. The exothermic response as recorded by the instrument will pass through a maximum and the time at which that maximum occurs is a good approximation of the crystallization half-time. For the purposes of these measurements, the time at the maximum will be taken as equivalent to the crystallization half-time. The minimum crystallization half-time is found by performing the above experiment at a number of crystallization temperatures and plotting the half-times as a function of crystallization temperature. This curve will pass through a minimum and the half-time at that minimum is the minimum crystallization half-time.

The polyester material may comprise polyesters having inherent viscosities of about 0.3 to about 1.5; inherent viscosity being determined by a concentration of 0.5 grams polymer in 100 milliliters of solvent (60 percent by weight phenol and 40 percent by weight tetrachloroethane), the polymer being dissolved at 125° C. and being measured at 25° C.

BEST MODE FOR CARRYING OUT THE INVENTION

Reinforced sheets are made by laminating alternating layers of polymer film and reinforcing fiber glass mat by heating in a compression press or continuous laminating press to temperatures of 260° C. or higher. The sheet is cooled under pressure. In the present invention, the reinforced sheet has at least one layer of a glass mat of such density as to impart reinforcement to the sheet, one layer of a fine stranded glass mat referred to in the trade as a surfacing mat or veil, one layer of a material located between the top layer of reinforcing material or glass mat and the surfacing mat or veil, and finally two outer layers of polyester-based material.

For purposes of stamping, the sheets are formed and held in a mold until the outer layers of the resulting part become crystalline, causing the sheet to retain the shape of the mold.

The invention thus concerns a multilayered thermoplastic polymeric sheet. The composition of the layers and their placement in the structure are crucial and distinguish this invention from the prior art. Most generally the structure can be described as follows:

|  |  |
|---|---|
|  | first layer, polymeric |
|  | second layer, fiber glass surfacing mat |
|  | third layer, polymeric |
| xxxxxxxxxxxxxx | fourth layer, fiber glass reinforcing mat |
|  | fifth layer, polymeric |
| xxxxxxxxxxxxxx | sixth layer, fiberglass reinforcing mat ⎫ * |
|  | seventh layer, polymeric ⎭ * |

*repeat n times, n≧1, to give desired thickness

The smooth surface finish is provided by the unique combination of the first through fifth layers. The specification of the individual layers is given below.

First and third layers—the third layer may be but is not necessarily the same composition as the first layer. Thicknesses of the first and third layers are between 10 and 40 mil., preferably about 30 mil.

Second layer—a layer of fine-stranded fiber glass mat known in the trade as a surfacing mat or veil. Mat density ranges from about 0.1 to about 0.4 oz./sq. ft. It is essential for this invention that the second layer be situated between the first and third layers, not directly over the fourth layer.

Forth layer—a reinforcing mat of long (1½ inches or greater) or continuous fiber glass. The density may range from about 1 to about 4 oz./sq. ft., preferably 2 to 3 oz./sq. ft. The reinforcing mat is present at a total level of about 20 to about 40% (preferably about 30%) of the weight of the entire composite sheet.

Fifth layer—for optimal surface properties, the fifth layer is a polymeric material having a low value of shrinkage or change in dimension as the sheet is cooled from the melt. It is theorized that polymeric material from the fifth layer may penetrate and largely envelope the reinforcing fiber glass mat. Thus, even if the third layer (that directly over the reinforcing mat) is not of a low-shrinkage polymer, the presence of the low-shrinkage material from the fifth layer will largely reduce the amount of shrinkage of polymer around the coarse reinforcing fibers. High shrinkage around these fibers is thought to cause or largely contribute to the problem of fiber "read-through". For the purposes of this invention, such dimensional change may be defined by the mold shrinkage test, ASTM Method D-955. Materials which are effective in the fifth layer in providing the especially improved surface finish are those with a mold shrinkage less than about 2% (molding for this test should be done under conditions that will give material in the same physical state as results from the sheet-forming process). This layer must also possess a minimum crystallization half-time of one minute or less.

The thickness of the fifth layer is at least 5 mil., preferably about 10 mil.

Seventh layer—the thickness is 10 mils to 40 mil., preferably about 30 mil.

The advantageous effect of using fillers in the third and fifth layers, other than an economical effect, is that the fillers further reduce the shrinkage in those layers to minimize or eliminate any tendency for fiber read-through.

The use of fillers, therefore, in the other polymeric layers as well as the third and fifth layers, provides an economical advantage, and in the outer layers provides uniform reinforcement to avoid resin-rich areas when forming ribs, bosses or similar shapes, as heretofore mentioned, thus resulting also in higher mechanical properties.

Sheets of these compositions may be prepared by laminating the layers together in a compression press or continuous laminating press at temperatures of about 260° C. to 270° C. The sheets are cooled under pressure.

To form useful parts, the composite sheet is heated, generally to the melting point of the highest melting polymeric component present. Radiant heating, for example infrared, is particularly useful. The molten sheet is then transferred to a hot (~160° C.) mold. The mold is closed and pressure maintained until crystallization of the PET occurs (about 30 to 45 seconds).

EXAMPLES

Pre-extruded sheet and fiber glass mats for the various layers were assembled in the proper order and laminated together in a Wabash compression press at 270° C. using a pressure of 24 tons on a 3-inch diameter ram. The composite was held in the melt for about two minutes, then cooled under pressure to about 50° C. Sheets were either made with the first layer against a polished ferro-type plate or formed in a test mold as described above to examine for the presence of "read-through" of the reinforcing mat fibers. Results of Examples 1 through 3 are summarized in Table 1.

These examples demonstrate the unexpected improvements in surface finish which result from the practice of this invention.

Example 3 demonstrates that when the fifth layer is comprised of a material having a minimum crystallization half-time of more than one minute, undesirable blistering, apparently related to the infrared heating step, occurs. While the surface is free of fiber "read-through", the blistering makes it unacceptable.

| Layer Composition | Example 1 | Example 2 | Example 3 |
|---|---|---|---|
| 1 | PET[3] 30 mil. | PET + 15% chopped fiber glass, 30 mil. | PET + 15% chopped fiber glass, 30 mil. |
| 2 | SURMAT[1] | SURMAT | SURMAT |
| 3 | PET[3], 30 mil. | PET + 15% chopped fiber glass, 30 mil. | PET + 15% chopped fiber glass, 30 mil. |
| 4 | OCF[2] M8621 | OCF M8621 | OCF M8621 |
| 5 | PET, 20 mil. | poly-76/24[4] 15 mil. | poly-69/31[5] 15 mil. |
| 6 | OCF M8621 | OCF M8621 | OCF M8621 |
| 7 | PET, 30 mil. | PET, 30 mil. | PET, 30 mil. |
| n | 1 | 1 | 1 |
| Surface Appearance | rough; "read-through" of reinforcing mat evident | very smooth | blistered surface |

[1]SURMAT - surfacing mat from Nicofibers, Inc., Shawnee, Ohio. Approximate density 0.2 oz./sq.ft.
[2]OCF M8621 - reinforcing mat Owens-Corning - density 2 oz./sq.ft.
[3]PET - I.V. 0.67 - poly(ethylene terephthalate)
[4]poly-76/24 - poly(76/24 1,4-cyclohexylenedimethylene/ethylene terephthalate) modified with 31 weight percent poly(30/70 oxyethylene/oxypropylene)having an average molecular weight of 1850. Minimum crystallization half-time 25 seconds; shrinkage less than 2% according to ASTM Method D-955.
[5]poly-69/31 - copoly(69/31 ethylene/1,4-cyclohexylenedimethylene terephthalate); minimum crystallization half-time 2650 minutes; shrinkage less than 2% according to ASTM Method D-955.

Permissible Variations

Although all of the examples have utilized two layers of 2 oz./sq. ft. reinforcing mat to minimize sheet thickness, it may be desirable to either omit the layer of polymer between the reinforcing mats and add as many layers of reinforcing mat back-to-back as needed, or use only one layer of reinforcing mat and vary its density as needed from about 1 to 4 oz./sq. ft. to obtain the level of reinforcement needed.

To avoid or control warpage or to provide a smooth surface on both sides of the sheet, it may be desirable to produce a sheet of balanced construction. To accomplish this, the same sequence of layers, first through fourth, would be repeated from the other outer layer or bottom layer of the sheet.

The reinforcing glass mat plies may be oriented in different directions to orient the fiber lengths and obtain the desired property. In addition, combinations of different types of mats, such as continuous and chopped strand, may be used. Chopped random fibers and/or fillers may also be added between plies. Different types of mat and/or fibers may also be employed, such as synthetic polymeric materials or graphite.

It may be desirable that additives be incorporated in the polymeric plies to impart characteristics such as mold release, stability or flame retardancy.

The thickness of the overall sheet may range from about 40 mil. to about 250 mil., preferably from about 50 mil. to about 150 mil. and still more preferably from about 60 mil. to about 100 mil. Of this thickness, at least 10 mil. but not more than 40% of the total thickness is composed of the fifth layer, which has a shrinkage of less than 2%, as determined in accordance with ASTM Method D-955 and a minimum crystallization half-time of one minute or less.

Applications

The stampable reinforced thermoplastic polyester sheet would find applications principally in the automotive industry in exterior parts which require a smooth, glossy finish after painting and a high heat distortion temperature. It would also find utility in business equipment and computer housings.

The stamped sheet thus formed from the stampable sheet described above has a heat deflection temperature under 264 psi. load greater than $T_m$-50° C., where $T_m$ is the melting point of the outer layer of the sheet.

The invention has been described in detail with particular reference to preferred embodiments thereof, but it will be understood that variations and modifications can be effected within the spirit and scope of the invention.

We claim:

1. A stampable sheet of reinforced thermoplastic material having on at least one surface of the sheet a smooth surface suitable for use as exterior automotive panels and the like, said sheet comprising:
   a plurality of layers of polymeric material and a plurality of layers of fibrous reinforcing material alternating with said layers of polymeric material, all of said layers being integrally formed together and the outer layers of said sheet being of a crystallizable material selected from poly(ethylene terephthalate), copolymers of poly(ethylene terephthalate) and blends thereof, poly(1,4-cyclohexanedimethylene terephthalate), copolymers of poly(1,4-cyclohexanedimethylene terephthalate) and blends thereof having a minimum crystallization half-time upon heating of one minute or less, the minimum crystallization half-time being that as measured with respect to each individual layer of said outer layers, wherein one of said outer layers is designated as a first layer;
   a second layer of surfacing mat of fine stranded glass having a weight of about 0.1 to about 0.4 oz./sq. ft., and positioned contiguously with respect to said first layer;
   a third layer of polymeric material positioned contiguously with the side of said second or surfacing layer opposite from said first layer and selected from
   a. poly(ethylene terephthalate);
   b. copolymers of poly(ethylene terephthalate) and blends thereof;
   c. poly(1,4-cyclohexanedimethylene terephthalate);
   d. copolymers of poly(1,4-cyclohexanedimethylene terephthalate) and blends thereof;
   e. a polyetherester comprised of
      1. a dicarboxylic acid component comprised of
         A. 100 to 60 mole percent terephthalic acid, and
         B. 0 to 40 mole percent of an aliphatic or aromatic dicarboxylic acid having a molecular weight of less than 300, and
      2. a diol component comprised of
         A. a glycol comprised of 100 to 60 mole percent tetramethylene glycol and 0 to 40 mole percent of an aliphatic or aromatic glycol having a molecular weight of less than 300, and
         B. 10 to 60 weight percent, based on the weight of the polyetherester, of a poly(alkylene oxide) glycol having 2, 3 or 4 carbon atoms in the repeating unit and having a molecular weight in the range of 400 to 5000,
      wherein the sum of the total mole percent amount of aliphatic or aromatic dicarboxylic acid having a molecular weight of less than 300 in item e.1.B, the mole percent amount of aliphatic or aromatic glycol having a molecular weight of less than 300 in item e.2.A., and the weight percent, based on the weight of the polyetherester, of the poly(alkylene oxide) glycol in item e.2.B. equals at least 25 but does not exceed 80;
   f. a polyetherester comprised of
      1. a dicarboxylic acid component comprised of
         A. 100 to 98 mole percent terephthalic acid, and
         B. 0 to 2 mole percent of a trifunctional carboxylic acid of molecular weight less than 300;
      2. a diol component comprised of
         A. a glycol comprised of 90 to 60 mole percent 1,4-cyclohexanedimethanol and 10 to 40 mole percent ethylene glycol or tetramethylene glycol, and
         B. 10 to 50 weight percent, based on the weight of the polyetherester, of a poly(alkylene oxide) glycol having 2 to 4 carbon atoms in the repeating unit and having a molecular weight in the range of 400 to 2000;
   g. a polyetherester comprised of
      1. a dicarboxylic acid component comprised of
         A. 100 to 98 mole percent 1,4-cyclohexanedicarboxylic acid and
         B. 0 to 2 mole percent of a trifunctional carboxylic acid of molecular weight less than 300;
      2. a diol component comprised of
         A. 1,4-cyclohexanedimethanol and
         B. 10 to 60 weight percent, based on the weight of the polyetherester, of a poly(alkylene oxide) glycol having 2 to 4 carbon atoms and a molecular weight in the range of 400 to 2000,
   said items (a) through (g) having a minimum crystallization half-time of one minute or less, the minimum crystallization half-time being that as measured with respect to each individual layer;
   said first and third layers each having about 5 to about 50 weight percent fillers selected from chopped strands of fiber glass of lengths less than about 1.4 inch, milled glass, glass spheres, novacite, talc, mica, calcium carbonate, barium sulfate and kaolin;
   a fourth layer comprising one of said layers of fibrous reinforcing material being positioned contiguously with the side of third layer opposite from said second layer; and
   a fifth layer of polymeric material positioned contiguously with the side of said fourth layer opposite from said third layer and being selected from
   h. copolymers of poly(1,4-cyclohexylenedimethylene 1,4-cyclohexanedicarboxylate) with about 10 to about 30 mole percent dimer acid;
   i. a polyetherester comprised of
      1. a dicarboxylic acid component comprised of A. 100 to 60 mole percent terephthalic acid, and B. 0 to 40 mole percent of an aliphatic or aromatic dicarboxylic acid having a molecular weight of less than 300, and 2. a diol component comprised of A. a glycol comprised of 100 to 60 mole percent tetramethylene glycol and 0 to 40 mole percent of an aliphatic or aromatic glycol having a molecular weight of less than 300, and B. 10 to 60 weight percent, based on the weight of the polyetherester, of a poly(alkylene oxide) glycol having 2, 3 or 4 carbon atoms in the repeating unit and having a molecular weight in the range of 400 to 5000, wherein the sum of the total mole percent amount of aliphatic or aromatic dicarboxylic acid having a molecular weight of less than 300 in item i.1.B., the mole percent amount of aliphatic or aromatic glycol having a molecular weight of less than 300 in item i.2.A., and the weight percent, based on the weight of the polyetherester, of the poly(alkylene oxide) glycol in item i.2.B equals at least 25 but does not exceed 80;

j. a polyetherester comprised of 1. a dicarboxylic acid component comprised of

A. 100 to 98 mole percent terephthalic acid, and

B. 0 to 2 mole percent of a trifunctional carboxylic acid of molecular weight less than 300;

2. a diol component comprised of

A. a glycol comprised of 90 to 60 mole percent 1,4-cyclohexanedimethanol and 10 to 40 mole percent ethylene glycol or tetramethylene glycol, and B. 10 to 50 weight percent, based on the weight of the polyetherester, of a poly(alkylene oxide) glycol having 2 to 4 carbon atoms in the repeating unit and having a molecular weight in the range of 400 to 2000;

k. a polyetherester comprised of 1. a dicarboxylic acid component comprised of

A. 100 to 98 mole percent 1,4-cyclohexanedicarboxylic acid and

B. 0 to 2 mole percent of a trifunctional carboxylic acid of molecular weight less than 300;

2. a diol component comprised of

A. 1,4-cyclohexanedimethanol and

B. 10 to 60 weight percent, based on the weight of the polyetherester, of a poly(alkylene oxide) glycol having 2 to 4 carbon atoms and a molecular weight in the range of 400 to 2000, said items (h) through (k) having a shrinkage of less than 2% as determined in accordance with ASTM Method D-955, and a minimum crystallization half-time of one minute or less.

2. A stampable sheet as defined in claim 1 wherein item (f) of said third layer of polymeric material and item (j) of said fifth layer of polymeric material comprise poly(about 70 to about 75 mole percent/about 30 to about 25 mole percent 1,4-cyclohexylenedimethylene/butylene terephthalate) modified with about 28 to about 33 weight percent poly(oxytetramethylene) of molecular weight 1000.

3. A stampable sheet as defined in claim 1 wherein item (j) of said fifth layer comprises poly(about 70 to about 75 mole percent/about 30 to about 25 mole percent 1,4-cyclohexylenedimethylene/butylene terephthalate) modified with about 0.5 to about 0.8 mole percent (based on the acid component present) trimellitic anhydride and about 28 to about 33 weight percent poly(oxytetramethylene) of molecular weight 1000.

4. A stampable sheet as defined in claim 1 wherein item (k) of said fifth layer comprises poly(1,4-cyclohexylenedimethylene 1,4-cyclohexanedicarboxylate) modified with about 0.25 to about 0.75 mole percent (based on the acid component present) trimellitic anhydride and about 22 to about 28 weight percent poly(oxytetramethylene) of molecular weight 1000.

5. A stampable sheet as defined in claim 1 wherein said layers of fibrous reinforcing material are comprised of glass fiber.

6. A stampable sheet as defined in claim 5 wherein the overall thickness of said sheet ranges from about 40 to about 250 mil., and said layers of glass fiber comprise about 20 to about 50% by weight of said stampable sheet.

7. A stampable sheet as defined in claim 5 wherein the overall thickness of said sheet ranges from about 50 to about 150 mil., and said layers of glass fiber comprise about 20 to about 50 percent by weight of said stampable sheet.

8. A stampable sheet as defined in claim 5 wherein the overall thickness of said sheet ranges from about 60 to about 100 mil., and said layers of glass fiber comprise about 30 to about 40% by weight of said stampable sheet.

9. A stampable sheet as defined in claim 1 wherein the other of said outer layers has about 5 to about 50 weight percent fillers selected from chopped strands of fiber glass of length less than about ¼ inch, milled glass, glass spheres, novacite, talc, mica, calcium carbonate, barium sulfate and kaolin.

10. A stampable sheet as defined in claim 1 wherein said fifth layer has about 5 to about 50 weight percent fillers selected from chopped strands of fiber glass of length less than about ¼ inch, milled glass, glass spheres, novacite, talc, mica, calcium carbonate, barium sulfate and kaolin.

11. A stamped sheet of reinforced material from the stampable sheet of claim 1 and having a heat deflection temperature under 264 psi. load greater than $T_m$-50° C. where $T_m$ is the melting point of the outer layers of the sheet.

12. A stamped sheet as defined in claim 11 wherein said layers of fibrous reinforcing material are comprised of glass fiber.

13. A stamped sheet of reinforced material from the stampable sheet of claim 1 and having a heat deflection temperature under 264 psi. load greater than $T_m$-50° C., where $T_m$ is the melting point in the outer layers of the sheet.

14. A stamped sheet as defined in claim 13 wherein said layers of fibrous reinforcing material are comprised of glass fiber.

* * * * *